(12) United States Patent
Allen et al.

(10) Patent No.: US 8,627,844 B2
(45) Date of Patent: Jan. 14, 2014

(54) MAGNETIC ESCUTCHEON MOUNTING ASSEMBLY

(75) Inventors: Benjamin Michael Allen, Indianapolis, IN (US); Kyle Robert Davidson, Noblesville, IN (US); Alfred C. Nelson, Carmel, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 503 days.

(21) Appl. No.: 12/609,489

(22) Filed: Oct. 30, 2009

(65) Prior Publication Data

US 2011/0100484 A1    May 5, 2011

(51) Int. Cl.
*F16L 5/02* (2006.01)
*F16L 5/00* (2006.01)

(52) U.S. Cl.
USPC .. 137/359; 137/315.01; 137/360; 403/DIG. 1

(58) Field of Classification Search
USPC .......... 137/359, 360, 315.01; 285/9.1, 46, 64; 4/675, 676, 677, 678, 695; 220/230; 335/296, 302, 303, 306; 148/101, 301, 148/303; 403/DIG. 1
See application file for complete search history.

(56) References Cited

U.S. PATENT DOCUMENTS

| | | | |
|---|---|---|---|
| 2,623,256 A * | 12/1952 | Feibelman | 24/303 |
| 3,181,895 A | 5/1965 | Cator | |
| 4,205,678 A | 6/1980 | Adair | |
| 4,231,137 A * | 11/1980 | Fujimoto | 24/303 |
| 4,232,695 A | 11/1980 | Roberge | |
| 4,304,256 A | 12/1981 | Taiani | |
| 4,384,703 A | 5/1983 | Ruyak et al. | |
| 4,427,960 A | 1/1984 | Wuerfel | |
| 4,718,131 A | 1/1988 | Kitamura et al. | |
| 4,989,278 A * | 2/1991 | Kostorz | 4/676 |
| 4,989,633 A * | 2/1991 | Humpert et al. | 137/360 |
| 5,096,230 A * | 3/1992 | Pausch et al. | 285/9.1 |
| 5,419,354 A | 5/1995 | Krynicki | |
| 5,645,302 A | 7/1997 | Horimoto | |
| 5,727,769 A | 3/1998 | Suzuki | |
| 5,771,934 A | 6/1998 | Warshawsky | |
| 6,023,951 A | 2/2000 | Maurer et al. | |
| 6,387,096 B1 | 5/2002 | Hyde, Jr. | |
| 6,718,569 B2 * | 4/2004 | Burger et al. | 4/695 |
| 6,757,921 B2 | 7/2004 | Esche | |

(Continued)

FOREIGN PATENT DOCUMENTS

| | | |
|---|---|---|
| JP | 2000-263060 | 9/2000 |
| JP | 2002-068270 | 3/2002 |
| JP | 2002-223969 | 8/2002 |

OTHER PUBLICATIONS

Grohe Product Catalog pages, "Stainless Steel Pull-Out Spray," 33 755, 2004, 4 pages.

(Continued)

*Primary Examiner* — John Fox
*Assistant Examiner* — Kevin Murphy
(74) *Attorney, Agent, or Firm* — Faegre Baker Daniels LLP

(57) ABSTRACT

An escutcheon mounting assembly including an escutcheon coupled to a base and including an opening for receiving a valve user interface. A magnetically attractive element is supported by one of the base and the escutcheon, and at least one magnet is affixed to the other of the base and the escutcheon and is configured to magnetically couple the escutcheon to the base.

30 Claims, 14 Drawing Sheets

(56) References Cited

U.S. PATENT DOCUMENTS

| | | |
|---|---|---|
| 6,786,239 B1 | 9/2004 | Welsh |
| 6,845,526 B2 | 1/2005 | Malek et al. |
| 6,877,172 B2 | 4/2005 | Malek et al. |
| 6,910,604 B2 | 6/2005 | Gugliotti et al. |
| 6,938,837 B2 | 9/2005 | Nelson et al. |
| 7,077,150 B2* | 7/2006 | McNerney ................. 137/15.01 |
| 7,114,510 B2 | 10/2006 | Peters et al. |
| 7,246,757 B2 | 7/2007 | Juo |
| 7,520,105 B2 | 4/2009 | Geller |
| 2003/0188381 A1 | 10/2003 | Bosio |
| 2004/0010848 A1 | 1/2004 | Esche |
| 2004/0135009 A1 | 7/2004 | Malek et al. |
| 2004/0144866 A1 | 7/2004 | Nelson |
| 2004/0177880 A1 | 9/2004 | Nelson |
| 2004/0254533 A1 | 12/2004 | Schriver et al. |
| 2005/0028890 A1* | 2/2005 | Sakaki et al. ................. 148/105 |
| 2005/0052018 A1* | 3/2005 | Pichotta ........................ 285/9.1 |
| 2006/0130907 A1 | 6/2006 | Marty et al. |
| 2006/0213585 A1* | 9/2006 | Nakamura et al. ............ 148/302 |
| 2006/0283511 A1 | 12/2006 | Nelson |
| 2007/0001018 A1 | 1/2007 | Schmitt et al. |
| 2007/0170284 A1 | 7/2007 | Nelson |
| 2008/0185060 A1 | 8/2008 | Nelson |
| 2008/0258854 A1* | 10/2008 | Davis ............................ 335/285 |

OTHER PUBLICATIONS

Latoscana Elba Kitchen Faucet With Magnetic Spray, Model 78CR557PMEX, retrieved from www.thehomedepot.com, prior to May 3, 2007, 2 pgs.

Latoscana Elba Kitchen Faucet With Magnetic Spray, Brushed Nickel Finish, Model 78PW557PMEX, retrieved from www.thehomedepot.com, prior to May 3, 2007, 2 pgs.

Latoscana Elba Kitchen Faucet With Magnetic Spray, Model 78CR557M, Design Specifications, retrieved from www.latoscanacollection.com, prior to May 3, 2007, 3 pgs.

* cited by examiner

MAGNETIC ESCUTCHEON MOUNTING ASSEMBLY

BACKGROUND AND SUMMARY OF THE INVENTION

The present invention relates to a wall mounted escutcheons. More specifically, this invention relates to mounting assemblies for coupling escutcheons coupled to wall supported mounting bases.

Conventional shower valves and escutcheons are known. Escutcheons typically hide components of the valve mounting and provide an aesthetic cover for the shower valve assembly. More particularly, escutcheons typically are coupled to the valve assembly with traditional fasteners, such as screws. Such screws may complicate the installation process and are often visible to the shower user, thereby decreasing the aesthetic appeal of conventional escutcheon mounting assemblies.

In one illustrative embodiment of the present disclosure, an escutcheon mounting assembly for a valve includes a base configured to be supported by a vertical wall, and an escutcheon configured to be coupled to the base, the escutcheon including an opening for receiving a valve user interface. A magnetically attractive element is supported by one of the base and the escutcheon, and at least one magnet is affixed to the other of the base and the escutcheon and is configured to magnetically couple the escutcheon to the base.

According to another illustrative embodiment of the present disclosure, an escutcheon mounting assembly for a wall mounted valve includes a base configured to be supported by a vertical wall, and an escutcheon configured to be coupled to the base and including an opening. A valve sleeve is configured to be operably coupled to the base and extend through the opening of the escutcheon. A magnetically attractive element is supported by one of the base and the escutcheon, and at least one magnet is affixed to the other of the base and the escutcheon and is configured to magnetically couple the escutcheon to the base.

According to a further illustrative embodiment of the present disclosure, an escutcheon mounting assembly includes a mounting base configured to be coupled to a wall and including opposing first and second ends. An escutcheon is supported by the mounting base and includes opposing first and second ends. A hinge is positioned proximate the first end of the escutcheon and pivotally couples the escutcheon to the mounting base. A magnetically attractive element is supported by one of the mounting base and the escutcheon. At least one magnet is affixed to the other of the mounting base and the escutcheon and is configured to magnetically couple the second end of the escutcheon to the mounting base.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments elected for description have been chosen to enable one skilled in the art to practice the invention.

Figure 1:
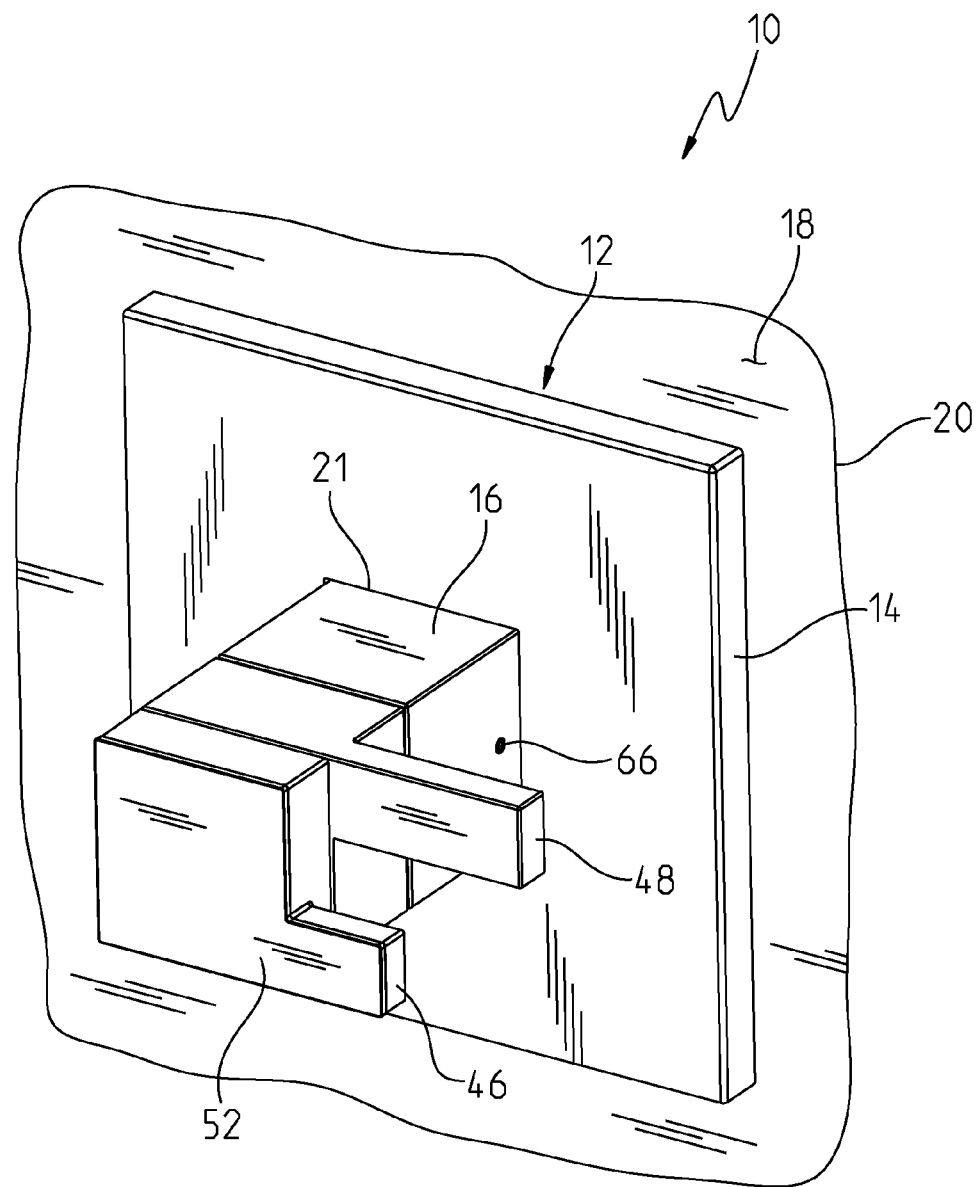
FIG. 1 is a front perspective view of an illustrative embodiment escutcheon mounting assembly.
Figure 2:
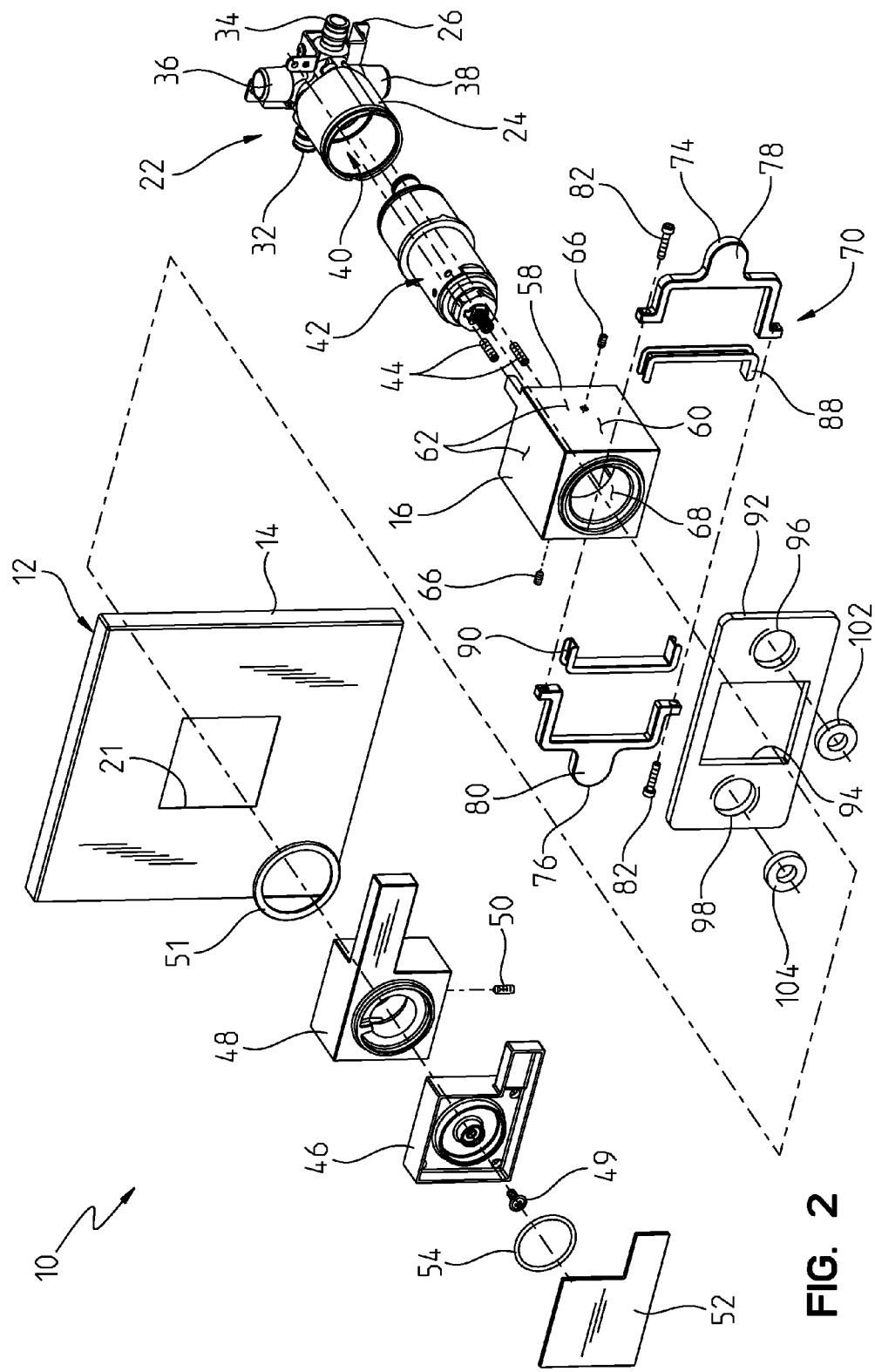
FIG. 2 is a front exploded perspective view of the mounting assembly of FIG. 1.
Figure 3:
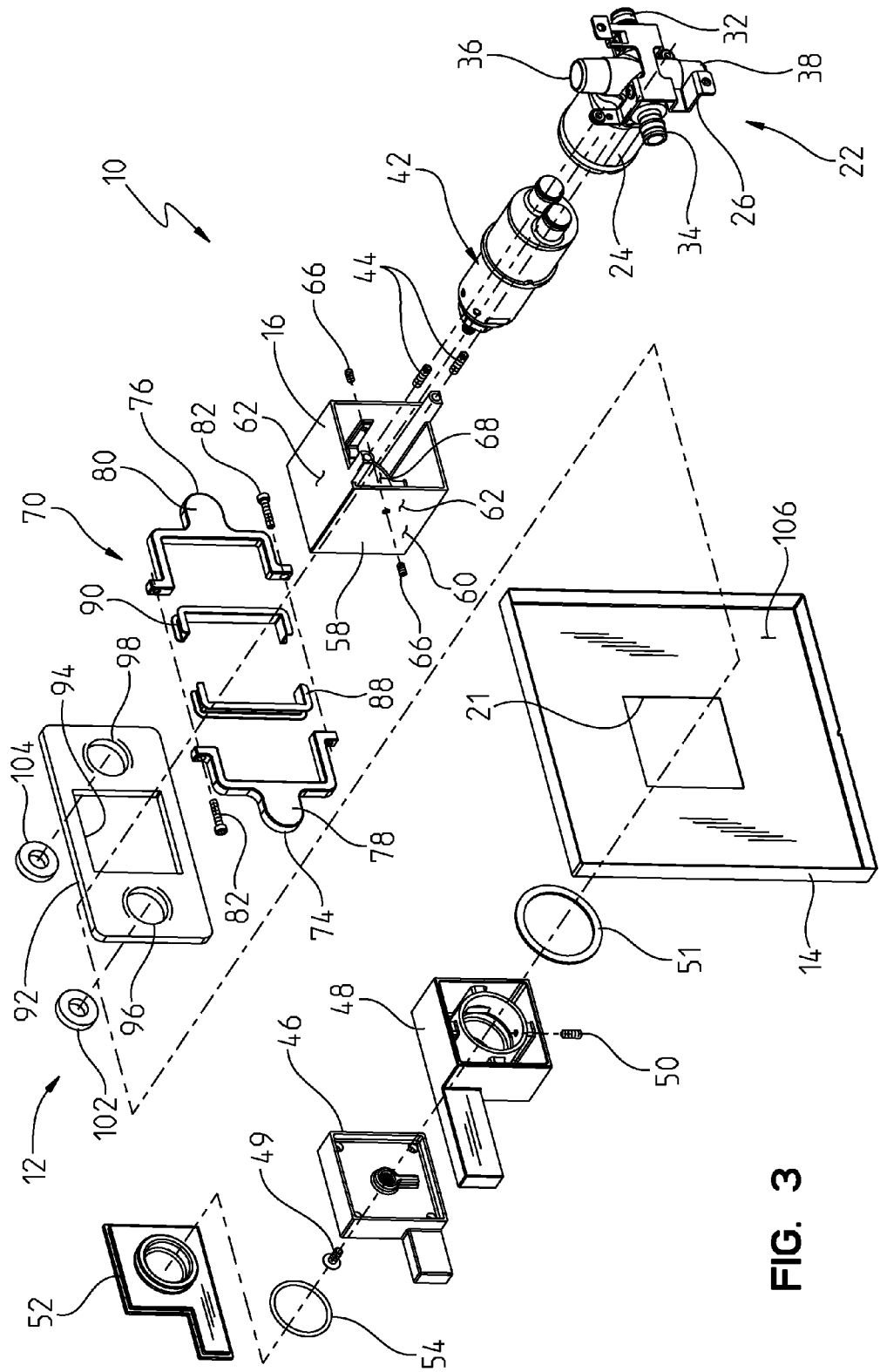
FIG. 3 is a rear exploded perspective view of the mounting assembly of FIG. 1.
Figure 4:
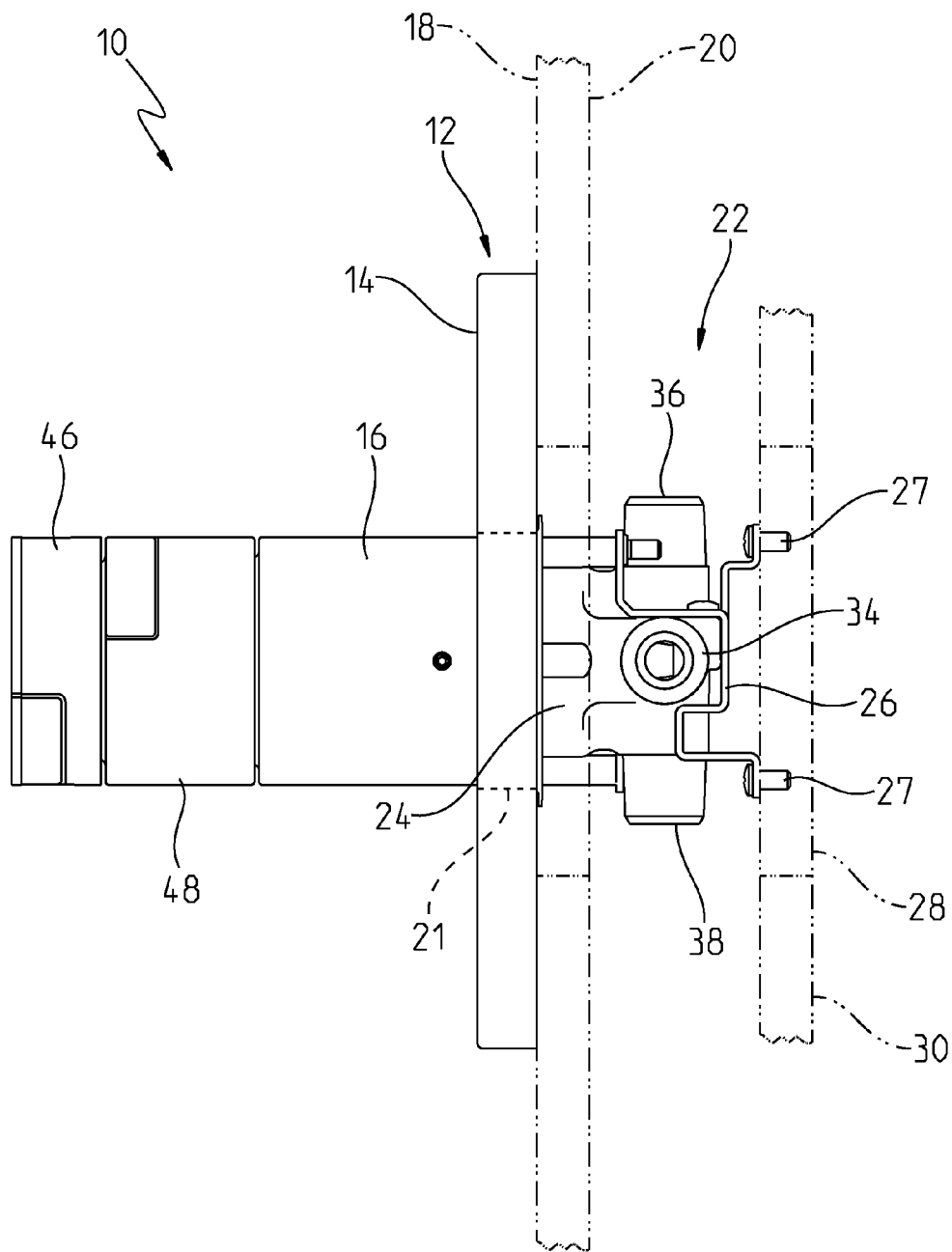
FIG. 4 is a side elevational view of the mounting assembly of FIG. 1.

Referring initially to FIGS. 1-4, a shower valve assembly 10 is shown as including an escutcheon mounting assembly 12 according to an illustrative embodiment of the present disclosure. As further detailed herein, the escutcheon mounting assembly 12 operably couples an escutcheon 14 to a valve sleeve 16. The valve sleeve 16 is supported by a vertical mounting surface 18 defined by a wall 20 and extends through an opening 21 defined by the escutcheon 14 (FIGS. 1 and 4).

With further reference to FIGS. 2-4, the escutcheon mounting assembly 12 is coupled to wall 20 through a valve body assembly 22 including a valve housing 24 coupled to a mounting bracket 26. Using traditional fasteners, such as screws 27, the bracket 26 is coupled to a stringer 28 in the wall 20. As is known, the stringer 28 extends horizontally between at least two studs 30 in the wall 20 (FIG. 4). The valve body assembly 22 may be of conventional design and includes a hot water inlet 32 and a cold water inlet 34 fluidly coupled to the valve housing 24. Similarly, a first mixed water outlet 36 and a second mixed water outlet 38 may be fluidly coupled to fluid delivery devices, such as a shower head and a tub spout (not shown). As is known, a diverter (not shown) may alternate the flow of mixed water between the first and second mixed water outlets 36 and 38. The valve housing 24 includes a cavity 40 configured to receive a valve cartridge 42.

As shown in FIGS. 2 and 3, the valve cartridge 42 is illustratively captured within the valve housing 24 by securing valve sleeve 16 to valve body assembly 22 with traditional fasteners, such as threaded inserts 44. The valve housing 24 and cartridge 42 extend outwardly from the wall 20. Illustratively, a first handle 46 is coupled to cartridge 42 for controlling water temperature, while a second handle 48 is coupled to cartridge 42 for controlling water flow. More particularly, operation of handles 46 and 48 causes cartridge 42 to control the flow of water from inlets 32 and 34 to respective mixed water outlet 36, 38. The handles 46 and 48 are operably coupled to the valve cartridge 42 by a screws 49 and 50, respectively. An o-ring 51 is positioned intermediate the second handle 48 and the valve sleeve 16. A front-end cap or cover 52 is coupled to the outer handle 46 to conceal the screw 50 and make the handle assembly aesthetically pleasing. An o-ring 54 may be positioned intermediate the front-end cap 52 and the outer handle 46.

Referring further to FIG. 3, the valve housing 24 extends from the wall 20 and is received into valve sleeve 16. Illustratively, the valve sleeve 16 includes a side wall 58 defining an outer surface 60 having a plurality of flat surfaces 62. As such, the valve sleeve 16 includes a cross-section that is substantially square. The valve cartridge 42 is secured from rotating relative to the valve sleeve 16 by traditional fasteners, such as set screws 66. The valve housing 24 illustratively includes a cylindrical inner surface 68 that conforms to the shape of the valve cartridge 42. The valve sleeve 16 is visible to a shower user and adds to the aesthetic appeal of the escutcheon mounting assembly 12.

With reference to FIGS. 2, 3, 5 and 6, the escutcheon mounting assembly 12 further includes a mounting member or base 70. Illustratively, the mounting member 70 comprises a mounting bracket including opposing first and second bracket members 74 and 76. The first and second bracket members 74 and 76 each include laterally extending bosses 78 and 80 having either a magnet or a magnetically attractive element. In the illustrative embodiment, the bosses 78 and 80 of first and second bracket members 74 and 76 each include a magnetically attractive element. The magnetically attractive element is illustratively formed of a magnetically attractable material, such as iron or steel. In certain illustrative embodiments, the magnetically attractive element may be formed of 410 stainless steel or a galvanized steel. The magnetically attractive element may also comprise a magnet.

Figure 5:
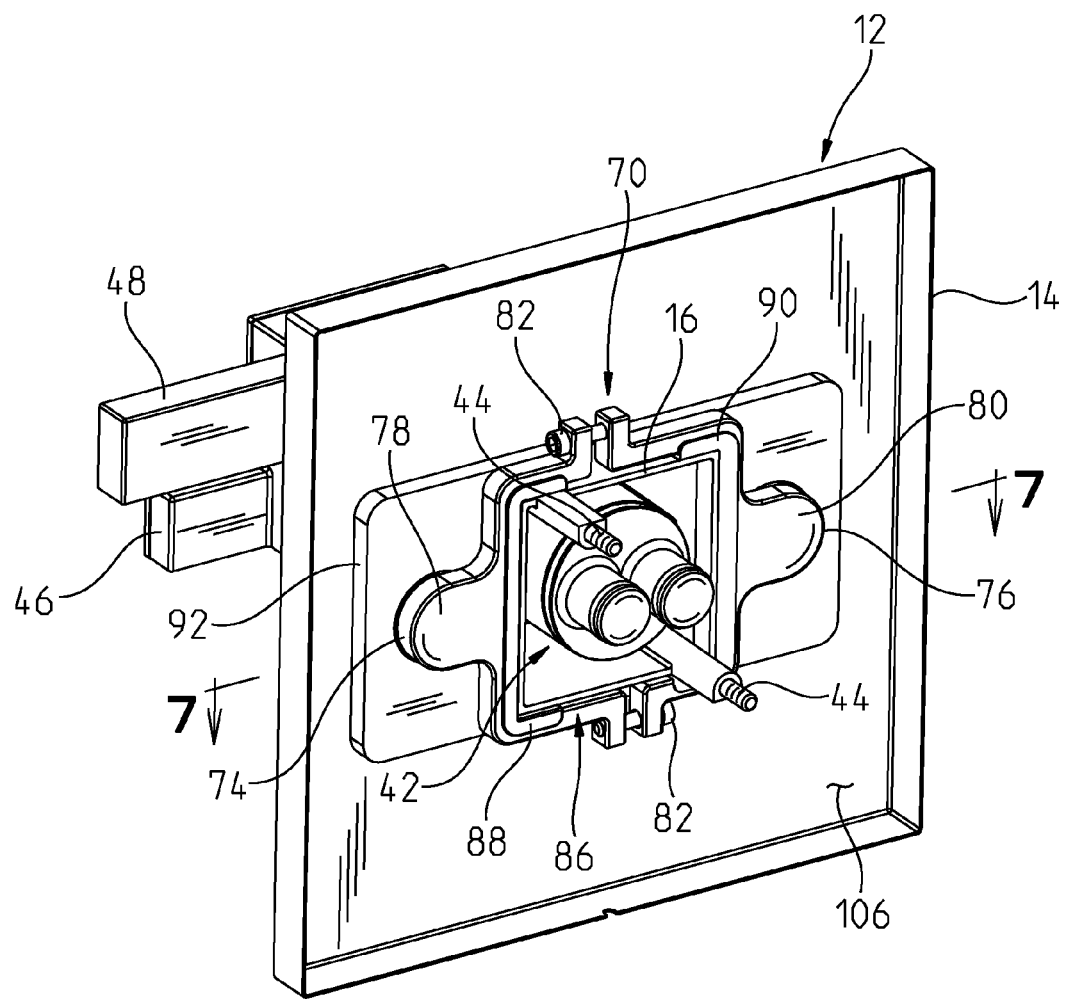
FIG. 5 is a rear perspective view of the mounting assembly of FIG. 1.

The first and second mounting bracket members 74 and 76 are coupled together using traditional fasteners 82 to form a substantially square center opening 86 configured to receive the valve sleeve 16 (FIG. 5). In this way, the bracket 70 is axially adjustable as it slides along the valve sleeve 56 when unclamped. The bracket 70 may then be secured at a desired position along sleeve 56. The adjustable nature of the bracket 70 accounts for varying wall depths and slides to a position adjacent the wall 20. The mounting bracket 70 includes protective liners 88 and 90 positioned adjacent the outer surface 60 of the valve sleeve 16. The liners 88 and 90 may be formed of an elastomeric material and aid in resisting axial movement of the bracket 70 once it is coupled to the valve sleeve 56. The liners 88 and 90 are clamped between the bracket members 74 and 76 and the valve sleeve 56. Additionally, the liners 88 and 90 protect the valve sleeve 56 in a situation where the bracket 72 is forcibly removed.

Figure 6:
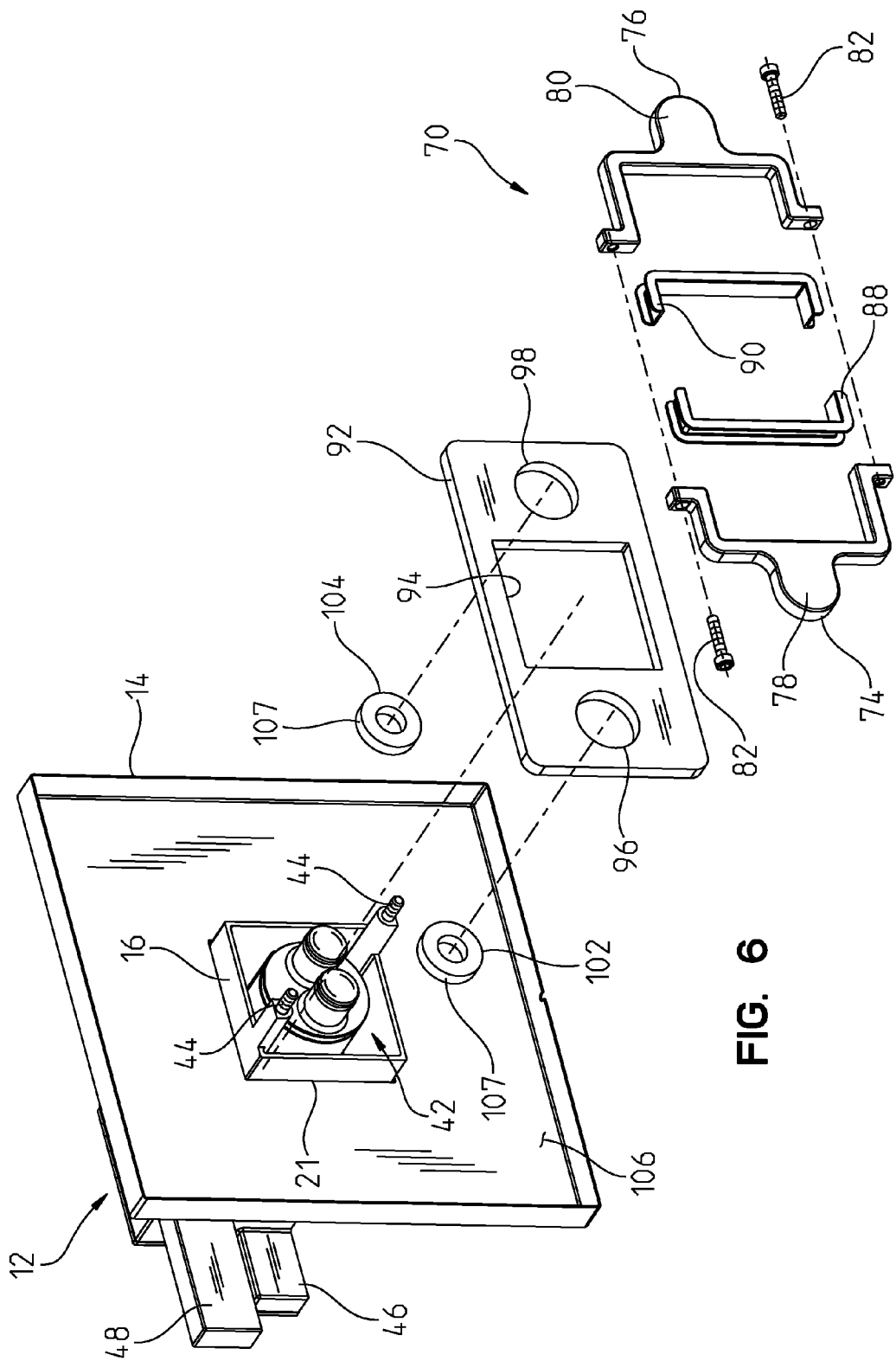
FIG. 6 is a rear partially exploded perspective view showing the mounting base, the seal, and the escutcheon of the mounting assembly of FIG. 1.

With reference to FIGS. 2, 3, 6 and 7, the mounting bracket 70 is illustratively positioned intermediate the vertical wall 20 and a seal 92. The seal 92 is comprised of a compressible material such as an elastomer with a center aperture 94 capable of receiving the valve sleeve 56. The seal 92 is axially adjustable along the valve sleeve 56 and physically contacts the mounting bracket 70. As shown in FIG. 6, the seal 92 further includes a first aperture 96 and a second aperture 98 on opposite sides of the center aperture 94. The first and second apertures 96 and 98 are configured to allow for the passage of magnetic fields. Illustratively, the first and second opposing apertures 96 and 98 are circular and positioned to expose magnets 102 and 104 and magnetically attractive elements 78 and 80.

In the embodiment shown in FIGS. 2 and 3, first and second magnets 102 and 104 releasably couple the escutcheon 14 to the mounting bracket 70. The escutcheon 14 may be manufactured from magnetically attractable material, such as brass, for securing the magnets 102 and 104 thereto. Alternately, a fastener or adhesive may be used to secure the magnets 102 and 104 to the escutcheon 14. The magnets 102 and 104 are positioned on a rear surface 106 of the escutcheon 14 such that when the escutcheon 14 is positioned proximate the mounting bracket 70, the magnets 102 and 104 couple to the magnetically attractive elements 78 and 80. The escutcheon 14 slides onto the valve sleeve 56 and fits against the seal 92 such that the magnets 102 and 104 align with the first and second apertures 96 and 98 of the seal 92 and couple with the magnetically attractive elements 78 and 80 on the mounting bracket 70.

Figure 7A:
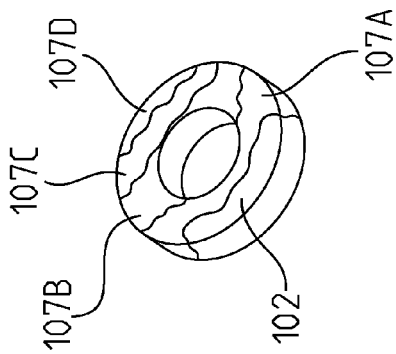
FIG. 7A is a perspective view of a magnet of FIG. 7, with partial cut-aways of the protective coatings.
Figure 7:
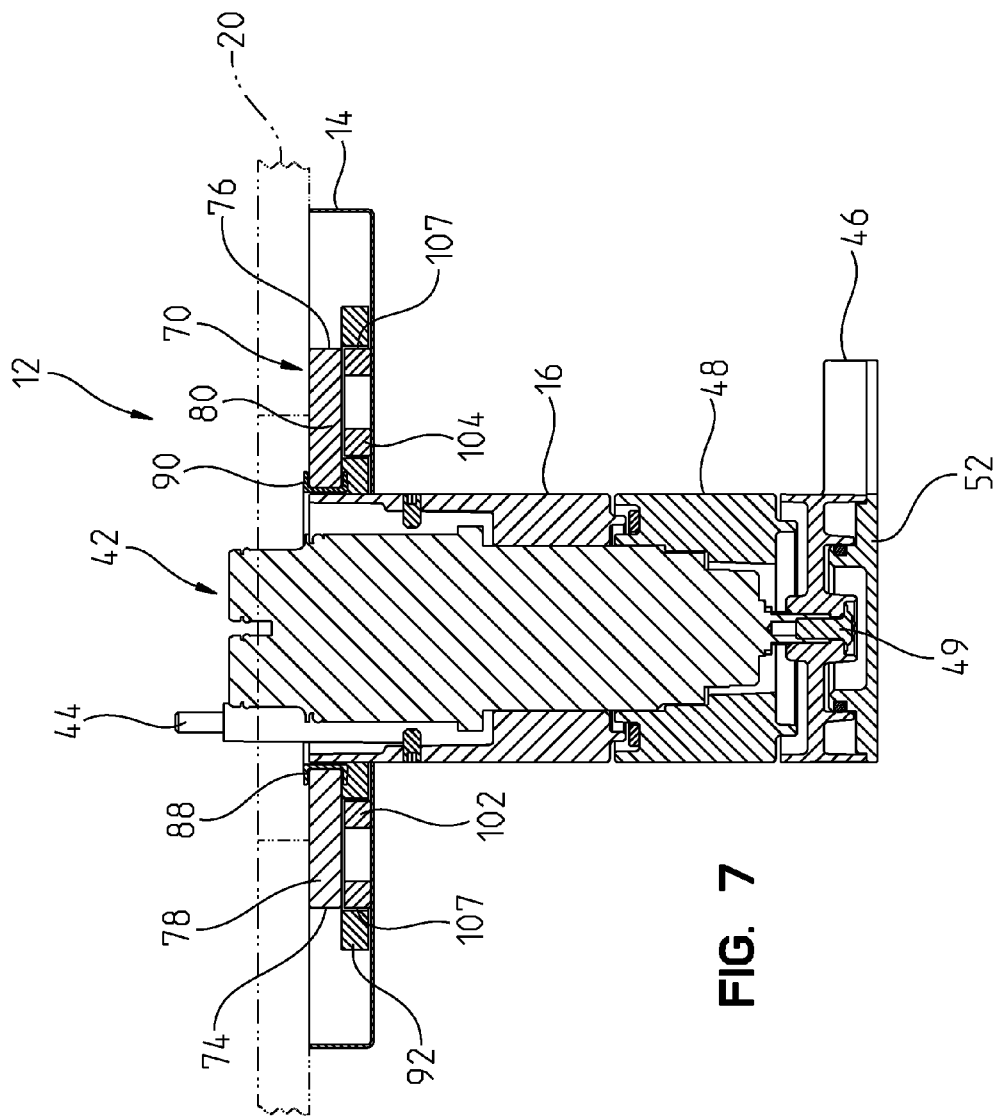
FIG. 7 is a cross-sectional view taken along line 7-7 of FIG. 5.

The magnets 102 and 104 of the illustrative embodiment are coated or plated to prevent humidity and wetness from corroding and decreasing the magnetic strength. In the illustrative embodiment of FIG. 7A, the magnets 102 and 104 may each include a coating 107, illustratively a first nickel layer 107$a$ below a copper layer 107$b$ which, in turn, is below a second nickel layer 107$c$ to prevent corrosion. An epoxy layer 107$d$ may be placed over the second nickel layer 107$c$ to prevent water penetration. In other illustrative embodiments, the coating 107 may be formed from other suitable materials, such as a polymeric overmold. Suitable types of magnets 102 and 104 are rare earth magnets. In one illustrative embodiment, the magnets 102 and 104 are formed from a neodymium magnetic slurry. While the magnets 102 and 104 in the present embodiment are permanent magnets, it is envisioned that other magnets, including electromagnets, could be used.

The coupling of the magnets 102 and 104 and the magnetically attractive elements illustratively generate a total coupling force of up to 25 $lb_f$ (i.e., up to 12.5 $lb_f$ per magnet). If an embodiment includes a gasket positioned between the wall 20 and the mounting assembly 12, this coupling force is strong enough to compress the gasket and create a seal against the wall. Further, magnets 102 and 104 with a total coupling force of up to 25 $lb_f$ can withstand contact from someone or something in the shower without inadvertently uncoupling the escutcheon mounting assembly 12. Additionally, in the event that the mounting assembly 12 needs to be repaired or replaced, the coupling force can be overcome to release the escutcheon 14 from the mounting bracket 70.

Magnets 102 and 104 may be of any conventional design. As is known, magnets have magnetic fields defined by their strength and orientation. Magnetic poles are regions in the magnet where the field of the magnet is most intense, each of which is likened to a geographic direction, north (N) or south (S). The direction of the magnetic field is the direction of a line that passes through the N and S poles of the magnet. Generally, the direction is perpendicular to the magnetic surface of the magnet. The orientation of the magnetic field is the direction pointed to by the N pole of the magnet.

Magnets with a single magnetic field are considered dipolar because they have two poles: a N pole and a S pole. The magnetic field of dipolar magnets can interact with other magnetic fields to produce a repelling or an attracting force. Magnets also may interact with magnetically attractive materials, such as iron or steel, that are naturally attracted to magnets.

There are several different types of magnets. A permanent magnet has a constant, or permanent, magnetic field. However, an electromagnet generates a magnetic field only when a flow of electric current passes through it. The strength of an electromagnetic field can be altered by changing the current that flows through the electromagnet. Once the current stops flowing through the material, the magnetic field disappears. The magnetic force of any magnet may be changed by altering the position of the magnet relative to another magnet or attractable material.

FIGS. 5 and 6 shown additional details of the mounting member or bracket 70 and liners 88 and 90. Illustratively, the first and second opposing members 74 and 76 of the mounting bracket 70 are joined with traditional fasteners 82, with the liners 88 and 90 positioned intermediate the valve sleeve 16 and the mounting bracket 70. As detailed herein, the liners 88 and 90 may serve multiple purposes. The liners 88 and 90 are a frictional barrier to prevent the bracket 70 from moving along the valve sleeve 16, and they protect the valve sleeve 16 if the bracket 70 is removed with excessive force. From the rear view of FIG. 5, the magnetically attractive elements 78 and 80 coupled to the first and second members 74 and 76 of the bracket 70 are positioned to conceal the first and second apertures 96 and 98 of the seal 92. In other words, the magnetically attractive elements 78 and 80 couple with the magnets 102 and 104 through the apertures 96 and 98 in the seal 92. The first and second magnets 102 and 104 also couple with the rear surface 106 of the escutcheon 14.

The escutcheon mounting assembly 12 is illustratively installed by working outwardly from the wall 20. The mounting bracket 26 of the valve body assembly 22 is secured to a stringer 28 in the wall 20 using conventional fasteners 27. The inlets 32 and 34 are threadedly coupled to water supplies, and the valve housing 24 receives valve cartridge 42. The valve sleeve 16 slides over the valve housing 24 and secures the valve cartridge 42 using conventional fasteners 44. The valve sleeve 16 projects from the wall 20 and has a substantially square cross-section. A bracket 70, including liners 88 and 90, slide onto the valve sleeve 16. The opposing first and second members 74 and 76 of the bracket 70 are positioned adjacent to the wall 20 and are secured together using screws 82. Next, seal 92 slides onto the valve sleeve 16 and is positioned parallel with the bracket 70. The seal 92 also is parallel with the escutcheon 14, which is received over the valve sleeve 16 through opening 21. Magnets 102 and 104 coupled to the rear surface 106 of the escutcheon 14 are aligned with the magnetically attractive elements 78 and 80 on each of the opposing first and second bracket members 74 and 76. The magnetic attraction between the magnets 102 and 104 and the magnetically attractive elements 78 and 80 couples the escutcheon 14 to the mounting bracket 70. A pair of handles 40 and 48 are operably coupled to the valve cartridge 42 through a screws 49 and 50.

Figure 8:
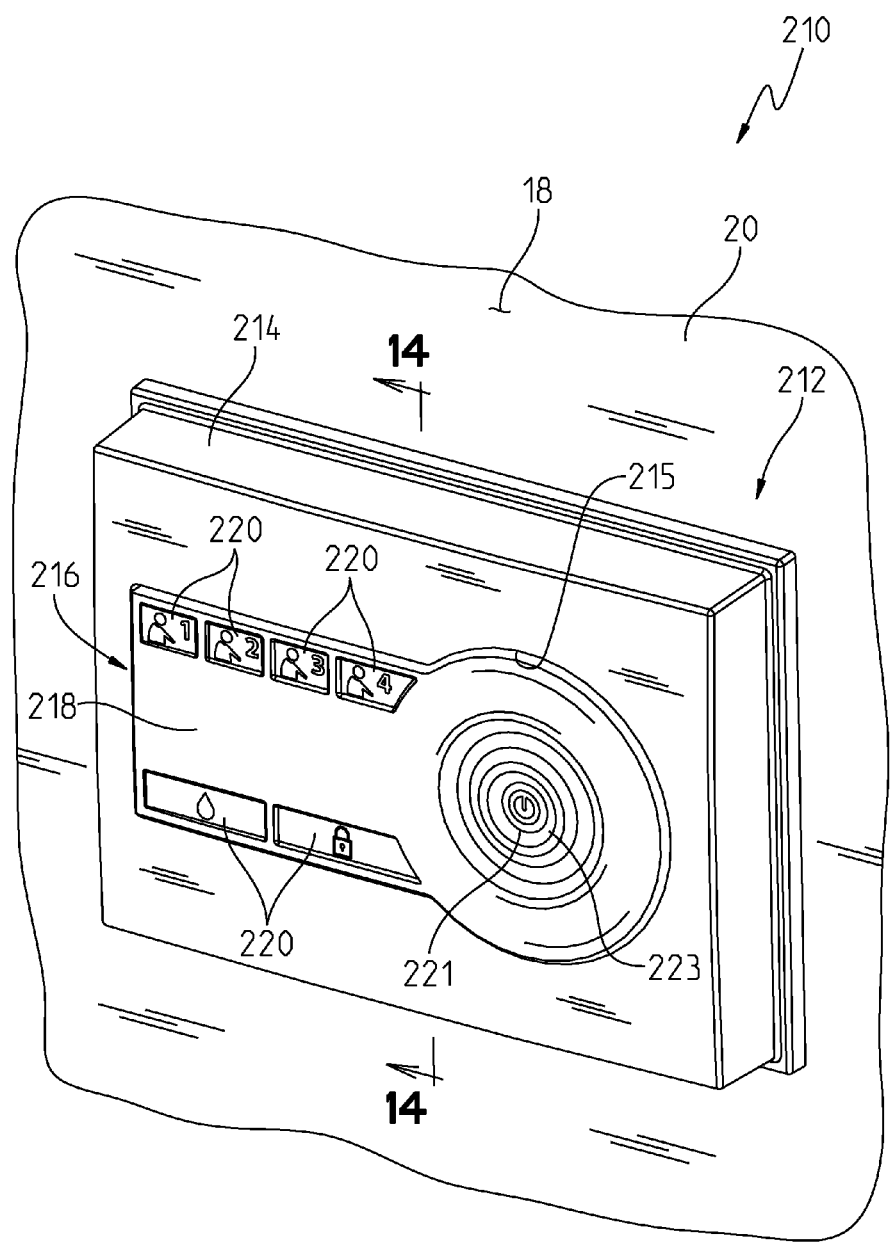
FIG. 8 is a front perspective view of a further illustrative embodiment escutcheon mounting assembly.

FIGS. 8-15 show a further illustrative embodiment magnetic escutcheon mounting assembly 212 for use with an electronic shower valve assembly 210. As further detailed herein, the escutcheon mounting assembly 212 includes an escutcheon 214 having an opening 215 for receiving an electronic user interface 216 accessible to someone in the shower. With reference to FIG. 8, the user interface 216 illustratively includes an interface panel 218 with a plurality of push buttons 220 related to different fluid delivery options. Illustratively, a temperature control input 221, such as a capacitive touch slide sensor disposed on an arcuate path, is supported by the interface panel 218 to control outlet water temperature. In a further illustrative embodiment, a flow control input 223 may be positioned adjacent the temperature control input 221 and configured to control the rate of outlet water flow. Again, the flow control input 223 may comprise a capacitive touch slide sensor disposed along an arcuate path. In alternative embodiments, a rotatable knob (not shown) may be manipulated by the user to control the flow rate and/or temperature of water delivered to the shower. Moreover, the interface panel 218 is configured to receive inputs from a user and convert those inputs into an output that maybe transmitted to an electric valve (not shown) to provide for specific fluid temperature, flow rate, and/or outlet pattern.

Figure 9:
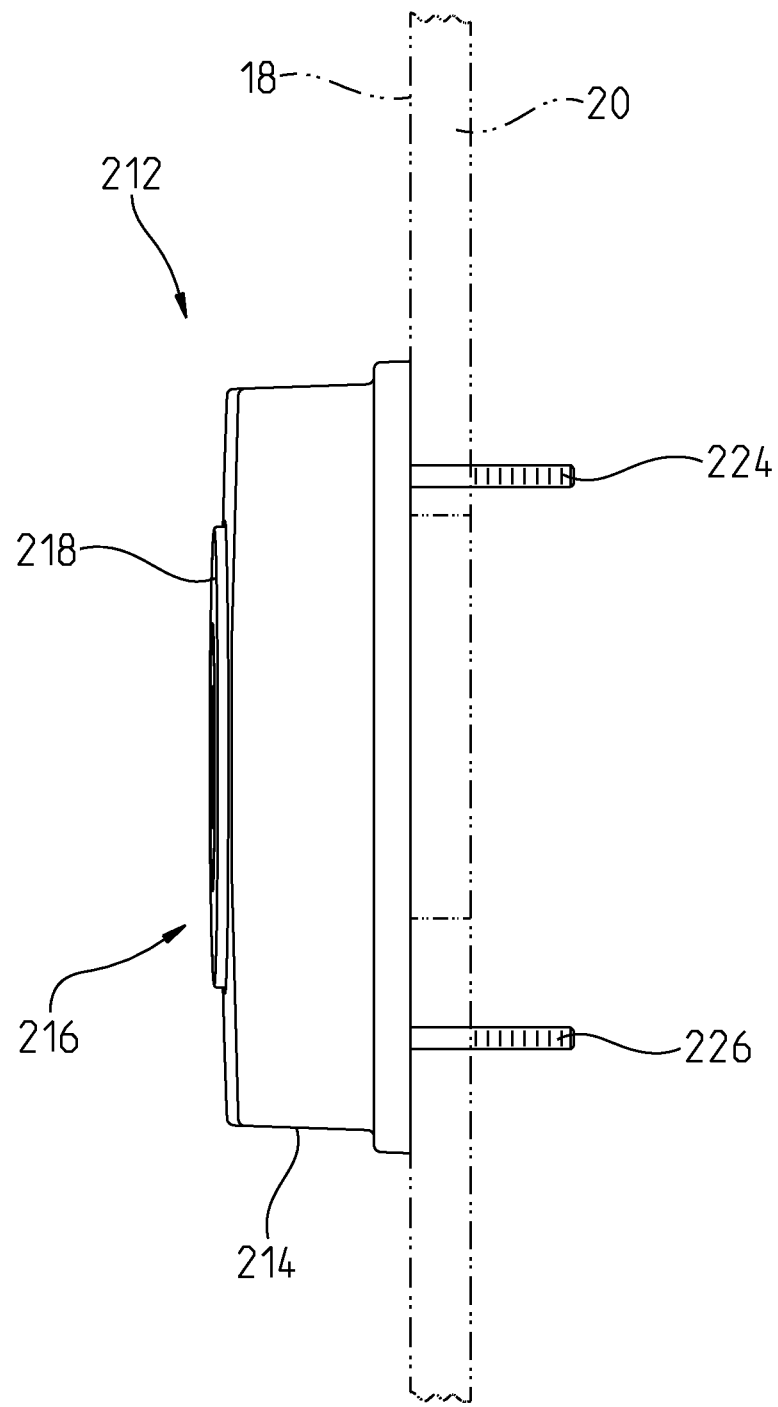
FIG. 9 is a side elevational view of the escutcheon mounting assembly of FIG. 8.
Figure 10:
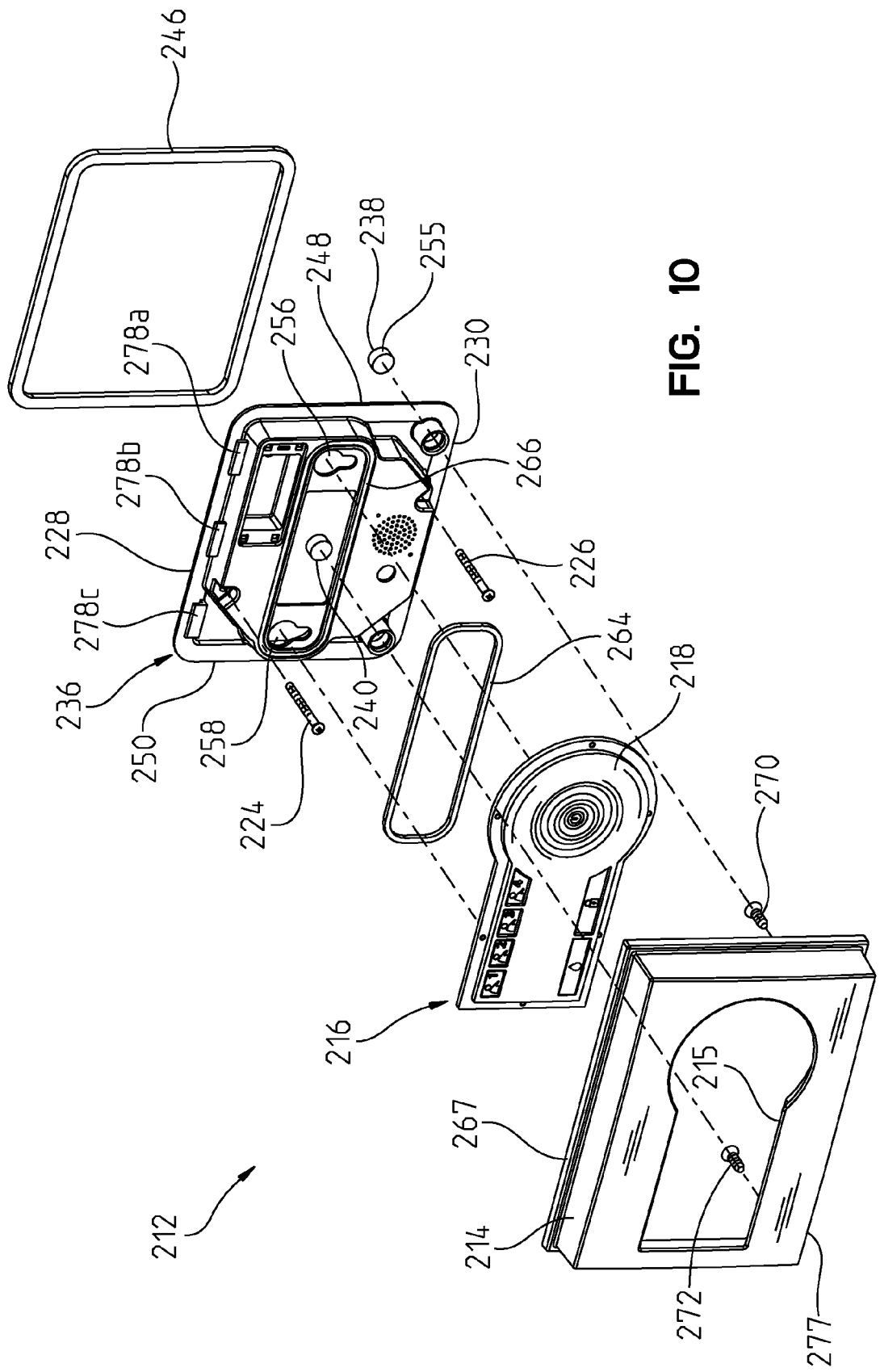
FIG. 10 is a front exploded perspective view of the escutcheon mounting assembly of FIG. 8.
Figure 11:
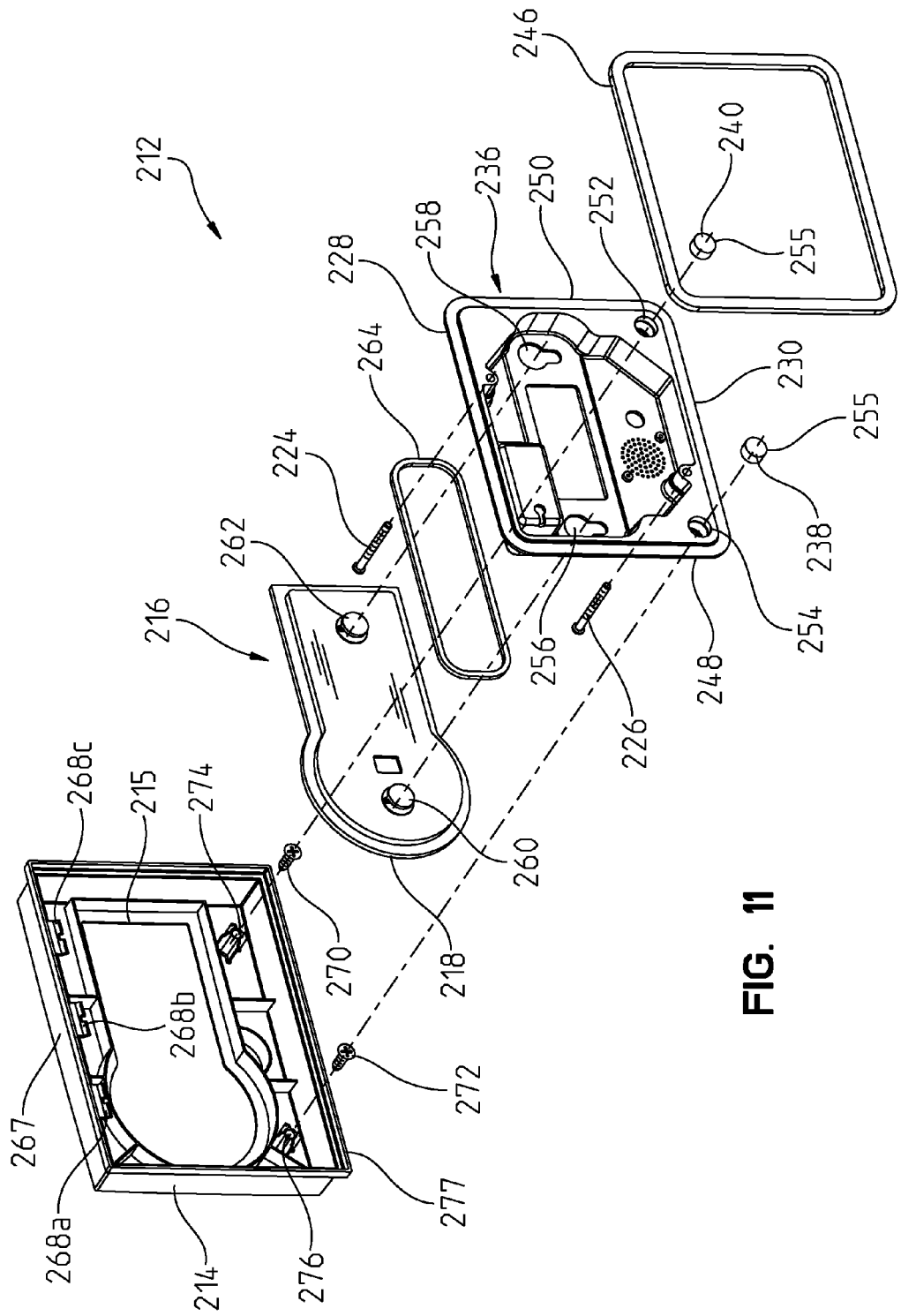
FIG. 11 is a rear exploded perspective view of the escutcheon mounting assembly of FIG. 8.

With reference to FIGS. 8 and 9, the escutcheon mounting assembly 212 is configured to be supported by vertical mounting surface 18 defined by the wall 20. As shown in FIGS. 10 and 11, the escutcheon mounting assembly 212 includes a mounting base 236 supporting a user interface 216, and escutcheon 214. Magnets 238, 240 and magnetically attractive elements 270, 272 are used to couple the escutcheon 214 to the mounting base 236. The mounting base 236 couples to the wall 20 using a plurality of mounting screws 224 and 226. Illustratively, a first mounting screw 224 is secured proximate upper edge 228 of the mounting base 236 and a second mounting screw 226 is secured proximate lower edge 230 of the mounting base 236. A seal 246 is compressed between the vertical wall 20 and the mounting base 236. The seal 246 may be formed from any compressible material, such as foam.

The mounting base 236 includes upper edge 228, lower edge 230, and opposing side edges 248 and 250. Two recesses 252 and 254 are positioned near the lower edge 230 of the mounting base 236. In the illustrative embodiment, the recesses 252 and 254 contain magnets 238 and 240 of substantially the same size and shape as the apertures 252 and 254. The magnets 238 and 240 are illustratively secured to the recesses 252 and 254 of the base 236 using conventional means, such as through an adhesive or epoxy. Optionally, magnetically attractive material may be adhered to the first and second apertures 252 and 254, rather than magnets 238 and 240. Illustrative magnets 238 and 240 are rare earth magnets. In one illustrative embodiment, the magnets 238 and 240 are formed from a neodymium magnetic slurry. While the magnets 238 and 240 in the present embodiment are permanent magnets, it is envisioned that other magnets, including electromagnets, could be used. The magnets 238 and 240 illustratively generate a total coupling force of up to 6 $lb_f$ (i.e., up to 3 $lb_f$ per magnet 238 and 240).

The magnets 238 and 240 of the illustrative embodiment are coated or plated to prevent humidity and wetness from corroding and decreasing the magnetic strength. For example, the magnets 238 and 240 may include a coating 255, illustratively an epoxy material to prevent corrosion. In other illustrative embodiments, the coating 255 may be formed from a polymeric overmold.

Figure 12:
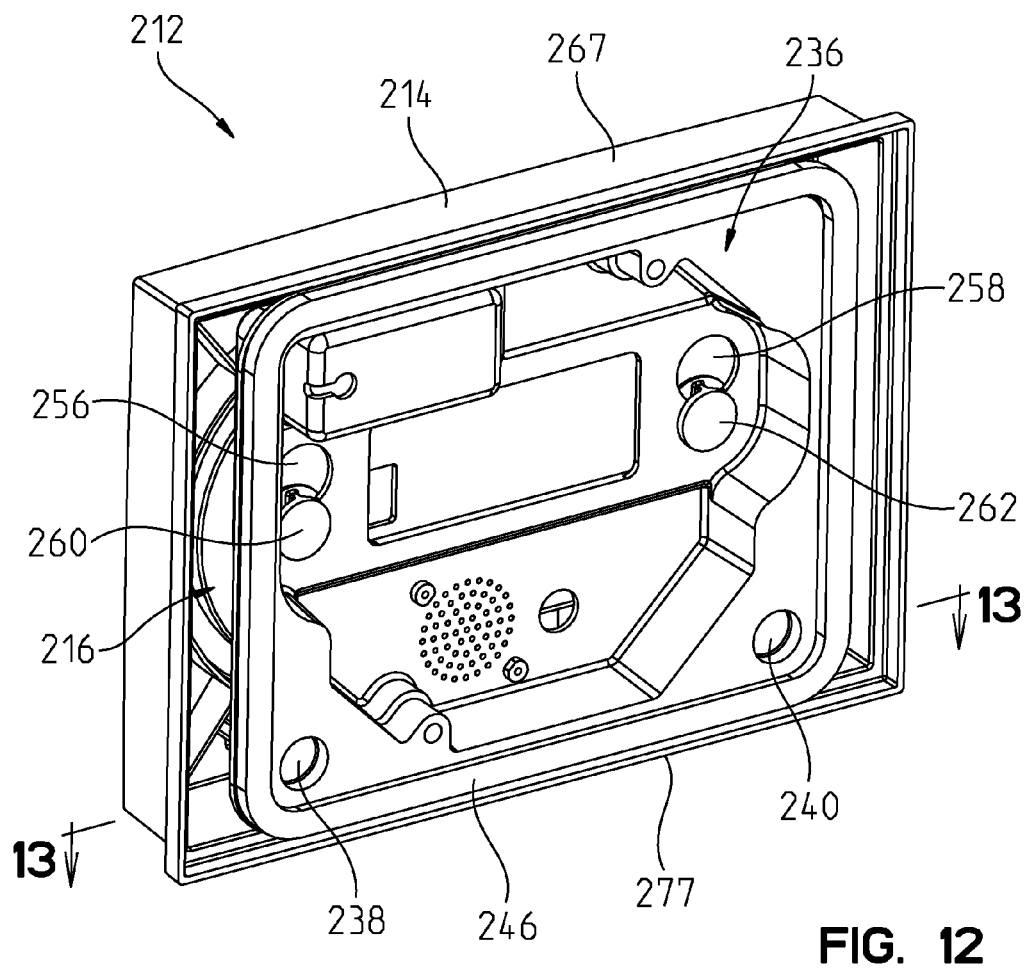
FIG. 12 is a rear perspective view of the escutcheon mounting assembly of FIG. 8.
Figure 13:
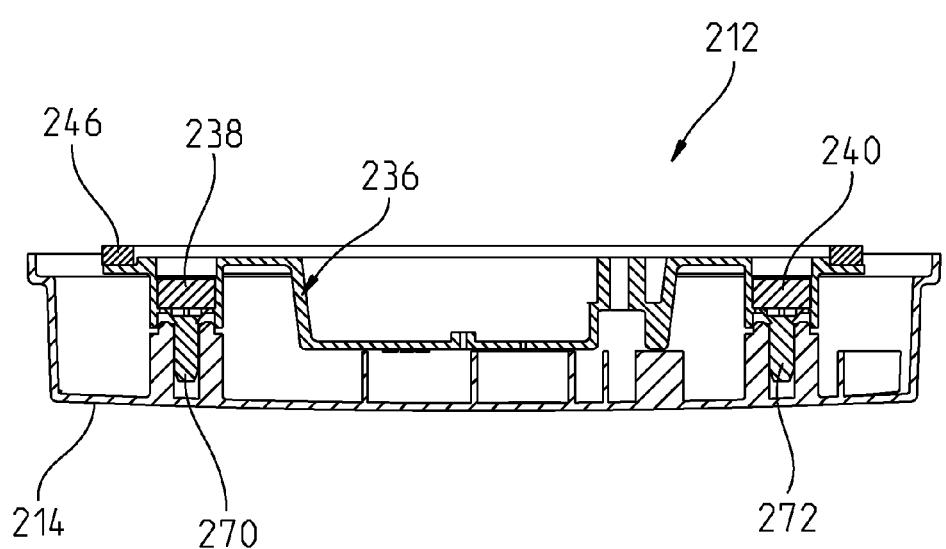
FIG. 13 is a cross-sectional view of the escutcheon mounting assembly taken along line 13-13 of FIG. 12.

With further reference to FIGS. 10-12, mounting base 236 has first and second keyhole slots 256 and 258 used to couple the user interface 216 to the mounting base 236. The user interface 216 includes first and second locking projections 260 and 262 configured to fit into the keyhole slots 256 and 258 and securely couple the user interface 216 to the mounting base 236. Positioned between the user interface 216 and the mounting base 236 is a seal 264. The seal 264 is placed against a front face 266 of the mounting base 236 (FIG. 10).

The escutcheon 214 is received over the user interface 216. Located along the upper edge 267 of the escutcheon 214 is at least one protrusion or tab 268. Illustratively, three protrusions 268a, 268b, 268c are supported proximate the upper edge 267 of the escutcheon 214. Located along a lower edge 277 of the escutcheon 214 is at least one magnetically attractive element, illustratively 410 stainless steel screws 270 and 272 received into first and second internally threaded bosses 274 and 276. The screws 270 and 272 may be replaced by other magnetically attractive elements, including magnets. The magnets 238 and 240 proximate the lower edge 230 of the mounting base 236 are attracted to the magnetically attractive elements 270 and 272, respectively, and couple the lower edge 277 of the escutcheon 214 to the lower edge 230 of the mounting base 236. The protrusions 268a, 268b, 268c proximate the upper edge 267 of the escutcheon 214 are coupled with recesses 278a, 278b, 278c, respectively, that are proximate the upper edge 228 of the mounting base 236. The protrusions 268 fit within the recesses 278 to form a hinge 284 that pivotally couples the escutcheon 214 to the mounting base 236.

As shown in FIGS. 10-12, the keyhole slots 256 and 258 are coupled with the first and second locking projections 260 and 262 of the user interface 216. The locking projections 260 and 262 slide from the upper end of the keyhole slots 256 and 258 to the lower end to secure the user interface 216 to the mounting base 236. The escutcheon 214 is coupled to the mounting base 236 using magnetic forces. Magnets 238 and 240 adhered to opposing first and second recesses 252 and 254 proximate the lower edge 230 of the mounting base 236 are attracted to the stainless steel screws 270 and 272 proximate the lower edge 277 of the escutcheon 214. In this way, the use of magnets 238 and 240 makes the escutcheon 214 more aesthetically pleasing because they are not visible to a user. Magnets 238 and 240 are hidden fastening means, not visible on the exterior of the escutcheon 214 in the way that conventional fasteners would be, and therefore, the shower valve assembly 210 has an aesthetically pleasing appearance.

Figure 14:
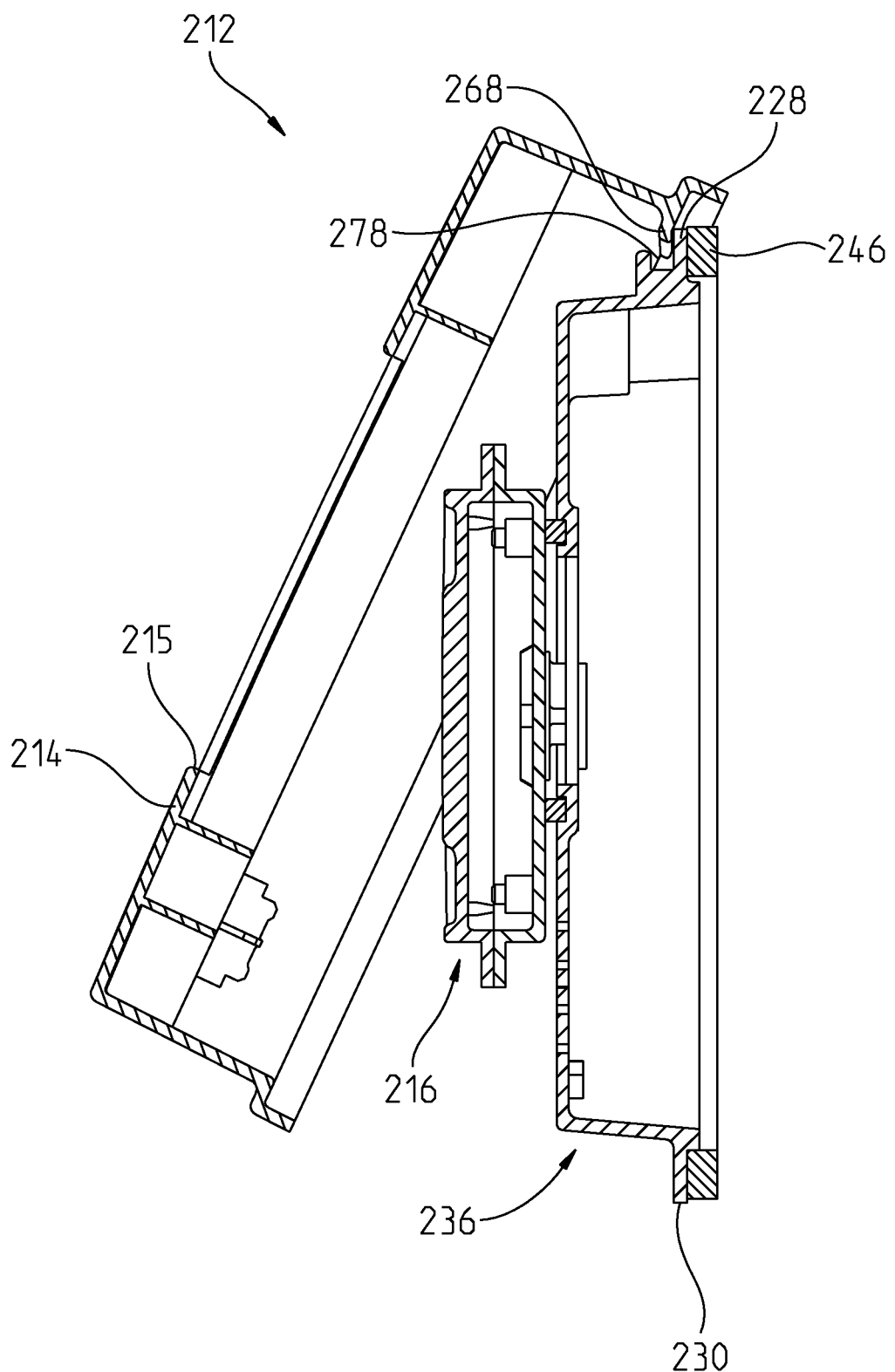
FIG. 14 is a cross-sectional view of the escutcheon mounting assembly taken along line 14-14 of FIG. 8 and showing the hinge in an open position, wherein the escutcheon is nonparallel to the mounting base.
Figure 15:
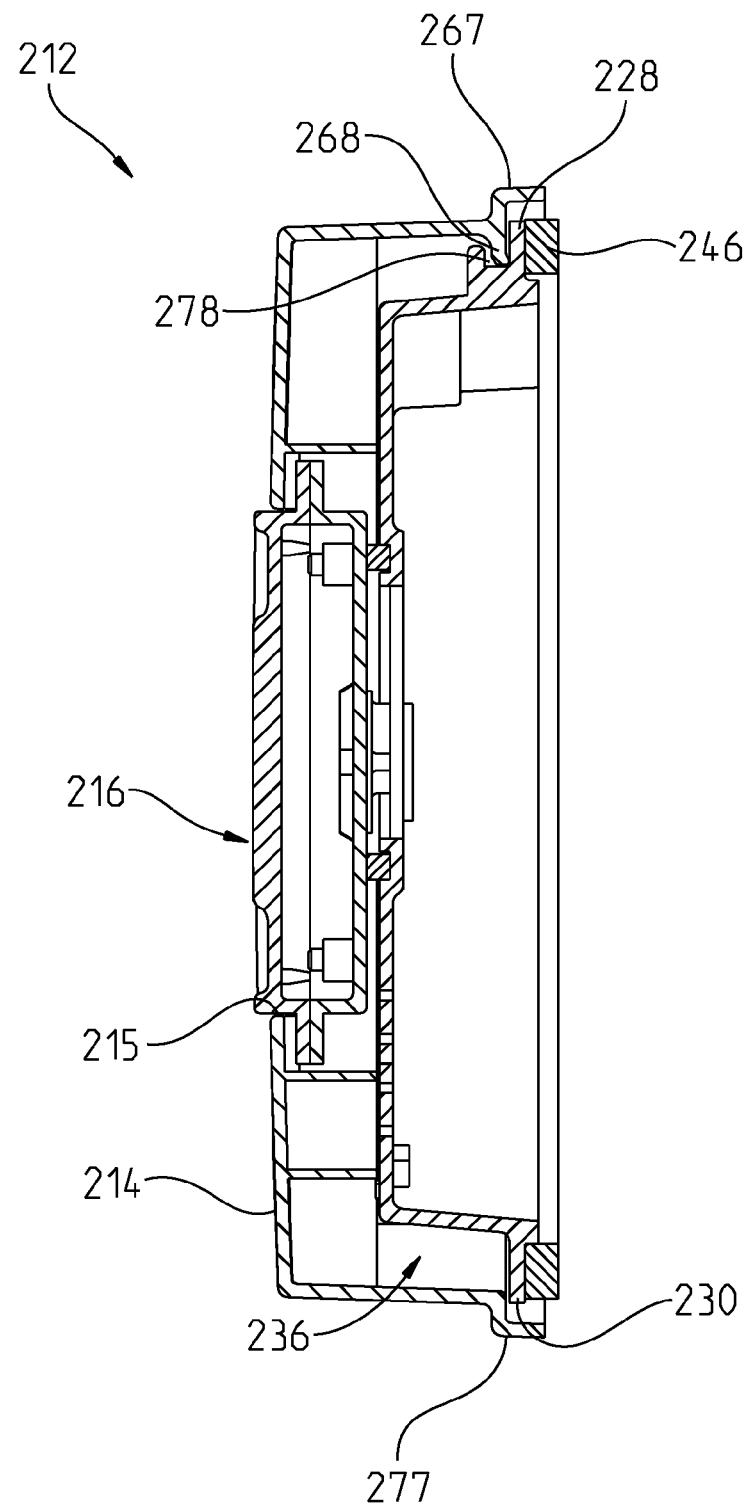
FIG. 15 is a cross-sectional view of the escutcheon mounting assembly taken along line 14-14 of FIG. 8 and showing the hinge in a closed position, wherein the escutcheon is parallel to the mounting base.

Turning now to FIGS. 14 and 15, hinge 284 is defined by the protrusion 268 of the escutcheon 214 and the recess 278 of the base 236. The hinge 284 is movable between an open position (FIG. 14) and closed position (FIG. 15). The protrusions 268 proximate the upper edge 267 of the escutcheon 214 fit into the recesses 278 proximate the upper edge 228 of the mounting base 236 to form hinge 284. The hinge 284 pivotally couples the escutcheon 214 to the mounting base 236. FIG. 14 shows the hinge 284 in an open position, defined by the escutcheon 214 in a nonparallel position relative to the mounting base 236. When the hinge 284 is in the open position, the escutcheon 214 is supported by the base 236 at only the hinge 284. The magnets 238 and 240 and magnetically attractive elements 270 and 272 are not coupled together. The escutcheon 214 is configured to pivot at the hinge 284 and move downward toward the closed position, as shown in FIG. 15.

More particularly, the closed position of the hinge 284 is defined by the escutcheon 214 in a parallel relation to the mounting base 236 (FIG. 15). In the closed position, the escutcheon 214 is supported by both the hinge 284 proximate the upper edges 267 and 228 of the escutcheon 214 and the mounting base 236 and the magnetic coupling force resulting from the magnets 238 and 240 and the magnetically attractive elements 270 and 272 near the lower edges 230 and 277 of the mounting base 236 and the escutcheon 214.

The escutcheon mounting assembly 212 is illustratively assembled by attaching the mounting base 236 to vertical wall 20 through screws 224 and 226. Seal 246 is positioned intermediate the wall 20 and the mounting base 236. With the base 236 secured to the wall 20, seal 264 is positioned in engagement with the front face 266 of the mounting base 236 and is compressed by the attachment of the user interface 216 to the mounting base 236. The user interface 216 couples to the mounting base 236 through keyhole slots 256 and 258 and locking projections 260 and 262. Once the user interface 216 is secured to the mounting base 236, the escutcheon 214 is attached. The protrusions 268 proximate the upper edge 267 of the escutcheon 214 is received within the recesses 278 proximate the upper edge 228 of the mounting base 236. The escutcheon 214 is pivoted downwardly until the magnets 238 and 240 couple with the magnetically attractive elements 270 and 272. In this way, the escutcheon mounting assembly 12 is coupled proximate both the upper edges 228 and 267 and the lower edges 230 and 277 if the mounting base 236 and the escutcheon 214.

Although the invention has been described in detail with reference to certain preferred embodiments, variations and modifications exist within the spirit and scope of the invention as described and defined in the following claims.

What is claimed is:

1. An escutcheon mounting assembly for a valve, the escutcheon mounting assembly comprising:
   a base configured to be supported by a vertical wall, the base comprising a mounting bracket including first and second bracket members forming a substantially rectangular cross section, wherein the first bracket member includes a first laterally extending boss;
   an escutcheon configured to be coupled to the base, the escutcheon including an opening for receiving a valve user interface;
   a first magnetically attractive element supported by one of the first laterally extending boss and the escutcheon; and
   a first magnet affixed to the other of the first laterally extending boss and the escutcheon and configured to magnetically couple the escutcheon to the first laterally extending boss;
   wherein the first magnetically attractive element and first magnet are positioned behind the escutcheon, and wherein the escutcheon entirely covers the first magnetically attractive element and the first magnet.

2. The escutcheon mounting assembly of claim 1, wherein the first magnet is a rare earth magnet.

3. The escutcheon mounting assembly of claim 1, further comprising a second magnet, wherein the first magnet is positioned to the left of a centerline of the base and the second magnet is positioned to the right of the centerline of the base.

4. The escutcheon mounting assembly of claim 1, further comprising a seal configured to be positioned between and contacting both of the escutcheon and the base and further configured with a first aperture capable of receiving the first magnet and a second aperture spaced apart from the first aperture capable of receiving the valve sleeve.

5. The escutcheon mounting assembly of claim 1 further comprising a valve body supported by the wall and a valve sleeve received over the valve body, wherein the base is operably coupled to the valve sleeve.

6. The escutcheon mounting assembly of claim 5, wherein the base is axially adjustable relative to the valve sleeve.

7. The escutcheon mounting assembly of claim 6, further comprising a valve cartridge received within the valve body along a common axis, wherein the base is adjustable along the common axis.

8. The escutcheon mounting assembly of claim 7, wherein the base defines an opening receiving the sleeve and is clamped to frictionally engage the sleeve, the valve cartridge extending through the opening of the escutcheon and the opening of the base.

9. The escutcheon mounting assembly of claim 1, wherein the first magnet includes a protective coating to resist corrosion.

10. The escutcheon mounting assembly of claim 9, wherein the protective coating comprises a polymeric overmold.

11. The escutcheon mounting assembly of claim 1, wherein the first magnet is formed of a neodymium magnetic slurry.

12. The escutcheon mounting assembly of claim 1, wherein the first magnet is affixed to the escutcheon with an adhesive.

13. The escutcheon mounting assembly of claim 1, wherein the escutcheon is formed from a magnetically attractable material and the first magnet is affixed to the escutcheon by a magnetic force.

14. The escutcheon mounting assembly of claim 1, wherein the second bracket member includes a second laterally extending boss, and further comprising:
   a second magnetically attractive element supported by one of second laterally extending boss and the escutcheon; and
   a second magnet affixed to the other of the second laterally extending boss and the escutcheon and configured to magnetically couple the escutcheon to the second laterally extending boss, wherein the first and second laterally extending bosses orient the escutcheon relative to the base.

15. An escutcheon mounting assembly for a wall mounted valve, the escutcheon mounting assembly comprising:
   a base configured to be supported by a vertical wall, the base comprising a mounting bracket including first and second bracket members forming a substantially rectangular cross section, wherein the first bracket member includes a laterally extending boss;
   an escutcheon configured to be coupled to the base and including an opening;
   a valve sleeve configured to be operably coupled to the base and extend through the opening of the escutcheon;
   a magnetically attractive element supported by one of the laterally extending boss and the escutcheon;
   a first magnet affixed to the other of the laterally extending boss and the escutcheon and configured to magnetically couple the escutcheon to the laterally extending boss wherein the magnetically attractive element and the first magnet are positioned behind the escutcheon, wherein the escutcheon entirely covers the magnetically attractive element and the first magnet; and
   a seal configured to be positioned between and contacting both of the escutcheon and the base and further configured with a first aperture for receiving the first magnet and a second aperture spaced apart from the first aperture for receiving the valve sleeve.

16. The escutcheon mounting assembly of claim 15, wherein the base is axially adjustable relative to the valve sleeve.

17. The escutcheon mounting assembly of claim 15 further comprising a valve body supported by the wall and configured to receive the valve sleeve, wherein the base is adjustable relative to the valve sleeve.

18. The escutcheon mounting assembly of claim 17, wherein the valve sleeve includes a plurality of flat surfaces.

19. The escutcheon mounting assembly of claim 18, wherein the plurality of flat surfaces of the valve sleeve define a substantially rectangular cross-section.

20. The escutcheon mounting assembly of claim 19, wherein the base is axially adjustable relative to the valve sleeve.

21. The escutcheon mounting assembly of claim 17 further including a handle operably coupled to the valve body.

22. The escutcheon mounting assembly of claim 17, further comprising a valve cartridge received within the valve body along a common axis, wherein the base is adjustable along the common axis.

23. The escutcheon mounting assembly of claim 22, wherein the base defines an opening receiving the sleeve and is clamped to frictionally engage the sleeve, the valve cartridge extending through the opening of the escutcheon and the opening of the base.

24. The escutcheon mounting assembly of claim 15, wherein the at least one magnet generates a total coupling force of at least 25 $lb_f$.

25. The escutcheon mounting assembly of claim 15, wherein the escutcheon is comprised of brass.

26. The escutcheon mounting assembly of claim 15, wherein the at least one magnet includes a protective coating to resist corrosion.

27. The escutcheon mounting assembly of claim 26, wherein the protective coating comprises a polymeric overmold.

28. The escutcheon mounting assembly of claim 26, wherein the protective coating includes a first nickel layer, a copper layer on top of the first nickel layer, a second nickel layer on top of the copper layer, and an epoxy layer on top of the second nickel layer.

29. The escutcheon mounting assembly of claim 15, wherein the at least one magnet is formed of a neodymium magnetic slurry.

30. The escutcheon mounting assembly of claim 15, further comprising:
   a second magnetically attractive element supported by one of the base and the escutcheon; and
   a second magnet supported by the other of the base and the escutcheon and configured to magnetically couple the escutcheon to the base, wherein the seal includes a third aperture for receiving the second magnet.

* * * * *